United States Patent
Kim et al.

(10) Patent No.: US 12,282,623 B2
(45) Date of Patent: Apr. 22, 2025

(54) MICROCONTROLLER, READOUT INTEGRATED CIRCUIT, AND METHOD OF DRIVING CIRCUIT

(71) Applicant: LX Semicon Co., Ltd., Daejeon (KR)

(72) Inventors: Ji Ho Kim, Daejeon (KR); Jun Tak Jeon, Daejeon (KR); Kyung Hwan Kim, Daejeon (KR); Sung Chun Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 591 days.

(21) Appl. No.: 17/725,364

(22) Filed: Apr. 20, 2022

(65) Prior Publication Data

US 2022/0357831 A1     Nov. 10, 2022

(30) Foreign Application Priority Data

May 4, 2021  (KR) ........................ 10-2021-0057687
Oct. 6, 2021  (KR) ........................ 10-2021-0132200

(51) Int. Cl.
  *G09G 3/20*   (2006.01)
  *G06F 3/041*  (2006.01)

(52) U.S. Cl.
  CPC ....... *G06F 3/04166* (2019.05); *G09G 3/2092* (2013.01); *G09G 2310/0286* (2013.01); *G09G 2310/08* (2013.01); *G09G 2354/00* (2013.01)

(58) Field of Classification Search
  CPC .............. G06F 3/04166; G09G 3/2092; G09G 2310/0286; G09G 2310/08; G09G 2354/00; G09G 2330/021; G09G 5/005; G09G 3/3208; G09G 3/2096; G09G 5/006; G09G 5/008; G09G 3/20; G09G 2310/0264
  See application file for complete search history.

(56) References Cited

U.S. PATENT DOCUMENTS

| | | | |
|---|---|---|---|
| 7,953,162 B2 | 5/2011 | Shetty | |
| 2019/0155432 A1* | 5/2019 | Park | G06F 3/0412 |
| 2020/0097112 A1* | 3/2020 | Seo | G06F 3/044 |
| 2021/0255753 A1* | 8/2021 | Ahn | G06F 3/044 |

* cited by examiner

*Primary Examiner* — Krishna P Neupane
(74) *Attorney, Agent, or Firm* — POLSINELLI PC

(57) ABSTRACT

The present disclosure relates to a microcontroller, a readout integrated circuit and a method of driving a circuit, and more particularly, to a microcontroller, a readout integrated circuit and a method of driving a circuit to transmit command signals by using a pair of lines, through which signals are transmitted from the microcontroller which is a master circuit to the readout integrated circuit which is a slave circuit, as two single-ended signal transmission lines and to control power of the readout integrated circuit which is a slave circuit.

20 Claims, 9 Drawing Sheets

MICROCONTROLLER, READOUT INTEGRATED CIRCUIT, AND METHOD OF DRIVING CIRCUIT

CROSS REFERENCE TO RELATED APPLICATION

This application claims priority from Republic of Korea Patent Applications Nos. 10-2021-0057687 filed on May 4, 2021 and 10-2021-0132200 filed on Oct. 6, 2021 which are hereby incorporated by reference in their entirety.

BACKGROUND

1. Field of Technology

The present disclosure relates to a microcontroller, a readout integrated circuit, and a method of driving circuits.

2. Description of the Prior Art

A display device may comprise various integrated circuits (IC), such as a timing controller, a source driver IC, etc. For communication between such integrated circuits, signals may be transmitted in a differential signaling method.

A master circuit to transmit signals transmits a clock signal and a data signal by keeping two signals independent of each other and a slave circuit to receive signals restores data by using a clock signal received from a master circuit.

A master circuit comprises a clock source so that it is possible to control power. However, since a slave circuit receives a clock signal from a master circuit to output a data signal, the slave circuit needs to always be on ON, and thus, bears a problem of power consumption.

SUMMARY OF THE INVENTION

In this background, an aspect of the present disclosure is to provide a technique for controlling power of a slave circuit by using a line through which a signal is transmitted in a differential signaling method from the slave circuit to a master circuit so as to transmit signals with low power.

To this end, in an aspect, the present disclosure provides a microcontroller comprising: a command transmission circuit to generate command signals, wherein the microcontroller receives a touch data signal generated in a readout integrated circuit through a pair of lines connected with the readout integrated circuit and transmits the command signals to the readout integrated circuit using the pair of lines as two single-ended signal transmission lines.

In another aspect, the present disclosure provides a readout integrated circuit comprising: a command reception circuit to receive command signals generated in a microcontroller, wherein the readout integrated circuit generates a touch data signal, transmits the touch data signal to the microcontroller through a pair of lines connected with the microcontroller in a differential signaling method, and receives the command signals using the pair of lines as two single-ended signal transmission lines.

In still another aspect, the present disclosure provides a method of driving a circuit comprising: transmitting a master clock signal and a master data signal from a master circuit to a slave circuit through a first wiring and a second wiring in a differential signaling method; transmitting a slave data signal from the slave circuit to the master circuit through a third wiring in the differential signaling method; and transmitting command signals from the master circuit to the slave circuit in order to control power of the slave circuit using the third wiring as a pair of single-ended signal transmission lines.

As described above, the present disclosure presents an effect in which a low power communication between integrated circuits is possible without any additional pin.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
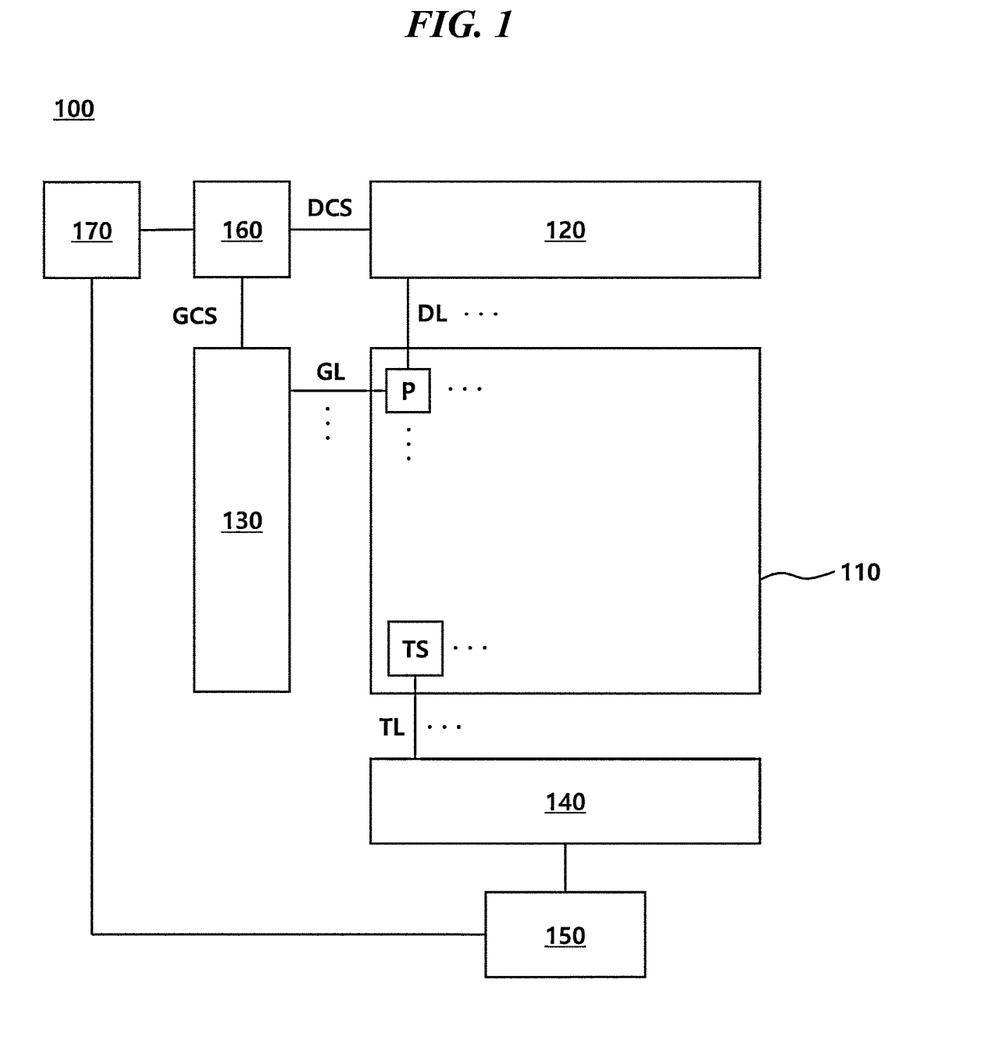
FIG. 1 is a configuration diagram of a display device according to an embodiment.

FIG. 1 is a configuration diagram of a display device according to an embodiment.

Referring to FIG. 1, a display device 100 may comprise a panel 110, a data driving device 120, a gate driving device 130, a touch driving device 140, a microcontroller 150, a data processing device 160, and a host 170.

At least one of the data driving device 120, the gate driving device 130, the touch driving device 140, and the data processing device 160 may be referred to as a display driving device. For example, the data driving device 120 may be referred to as a display driving device or a driving device comprising the data driving device 120 and the touch driving device 140 may be referred to as a display driving device. One driving device may be comprised in another driving device. For example, the data driving device 120 may be comprised in the touch driving device 140. Otherwise, the gate driving device 130 may be comprised in the data driving device 120. Depending on embodiments, only some components of one driving device may be comprised in another driving device.

The data driving device 120 may drive data lines DL connected with pixels P and the gate driving device 130 may drive gate lines GL connected with pixels P. The touch driving device 140 may drive touch sensors TS disposed in the panel 110.

The data driving device 120 may supply a data voltage to a data line DL in order to display an image in a pixel P of the panel 110. The data driving device 120 may comprise at least one data driver integrated circuit, and this at least one integrated circuit may be connected to a bonding pad of a display panel 110 in a tape automated bonding (TAB) method or a chip-on-glass (COG) method, directly formed on a display panel 110, or integrated on a display panel 110 depending on a case. In addition, a data driving device 120 may be formed in a chip-on-film (COF) type.

The data driving device 120 may receive image data and a data control signal DCS from the data processing device 160. The data driving device 120 may generate a data voltage according to a greyscale value of each pixel indicated by image data and drive a pixel.

The gate driving device 130 may supply a scan signal to a pixel P through a gate line GL so as to turn on or off a transistor disposed in the pixel P. Depending on a driving method, the gate driving device 130 may be disposed at one side of the panel 110 as shown in FIG. 1 or may be divided into two and disposed at both sides of the panel 110. The gate driving device 130 may comprise at least one gate driver integrated circuit, and this at least one integrated circuit may be connected to a bonding pad of a display panel 110 in a tape automated bonding (TAB) method or a chip-on-glass (COG) method, directly formed on a display panel 110, or integrated on a display panel 110 depending on cases. In addition, the gate driving device 130 may be formed in a chip-on-film (COF) method.

The gate driving device 130 may receive a gate control signal GCS from the data processing device 160. The gate control signal GCS may comprise a plurality of clock signals. The gate driving device 130 may generate a scan signal by using a clock signal and supply the scan signal to a gate line GL.

The panel 110 may comprise a display panel and may further comprise a touch panel (or a touch screen panel). The display panel and the touch panel may share some components. For example, a touch sensor TS of the touch panel for sensing a touch may be used as a common electrode, to which a common voltage is supplied, in the display panel in a case when the display panel is a liquid crystal display (LCD) panel. For another example, a touch sensor TS may be used as a cathode electrode, to which a base voltage is supplied, in the display panel in a case when the display panel is an organic light emitting diode (OLED) panel. Such a panel 110 may be called "an integrated panel", considering that some components are shared by the display panel and the touch panel. However, the present disclosure is not limited thereto. In addition, an in-cell type panel, in which a display panel and a touch panel are integrally combined, is known, but this is only an example of the above-described panel 110. A panel, to which the present disclosure is applied, is not limited to the in-cell type panel.

On the panel 110, a plurality of touch sensors TS may be disposed and the touch driving device 140 may drive a touch sensor TS by using a touch driving signal. The touch driving device 140 may generate a sensing value of a touch sensor according to a response signal formed in the touch sensor TS in response to the touch driving signal. The touch driving device 140 may be connected with a touch sensor TS through a touch line TL and transmit sensing values for a plurality of touch sensors TS disposed in the panel 110 to the microcontroller 150. The microcontroller 150 may calculate touch coordinates by using sensing values and the calculated touch coordinates may be transmitted to the host 170 and used by the host 170.

The touch driving device 140 may transmit and receive a signal with an object touching a touch panel through a touch sensor TS. The touch driving device 140 may receive a touch control signal TCS from the data processing device 160. A touch control signal TCS may comprise at least one synchronization signal. For example, a touch control signal TCS may comprise a vertical synchronization signal, a time division signal, a touch synchronization signal, etc. The touch driving device 140 may identify the division of a display section and a touch section indicated by a time division signal or a touch synchronization signal and drive a touch sensor during the touch section.

Synchronization signals may be the same or different from each other depending on embodiments. For example, a time division signal may be the same as a touch synchronization signal or different from a touch synchronization signal. A specific name may be used in the relevant description below in order to emphasize a specific function. However, such a description is not limited by the specific name.

Synchronization signals may originally be generated based on a panel control signal PCS supplied from the host 170 to the data processing device 160.

The host 170 may transmit image data and subsequently transmit a vertical synchronization signal VSYNC in order to divide the image data by frame. The data processing device 160 may generate a time division signal, a touch synchronization signal TSYNC, etc. based on the vertical synchronization signal VSYNC and transmit them to the respective driving devices 120, 130, 140.

The data processing device 160 may receive image data or information of touch coordinates from the host 170 and control timings of the respective driving devices 120, 130, 140 by transmitting display driving device control signals GCS, DCS, TCS. The data processing device 160 may be referred to as a timing controller in this aspect.

Figure 2:
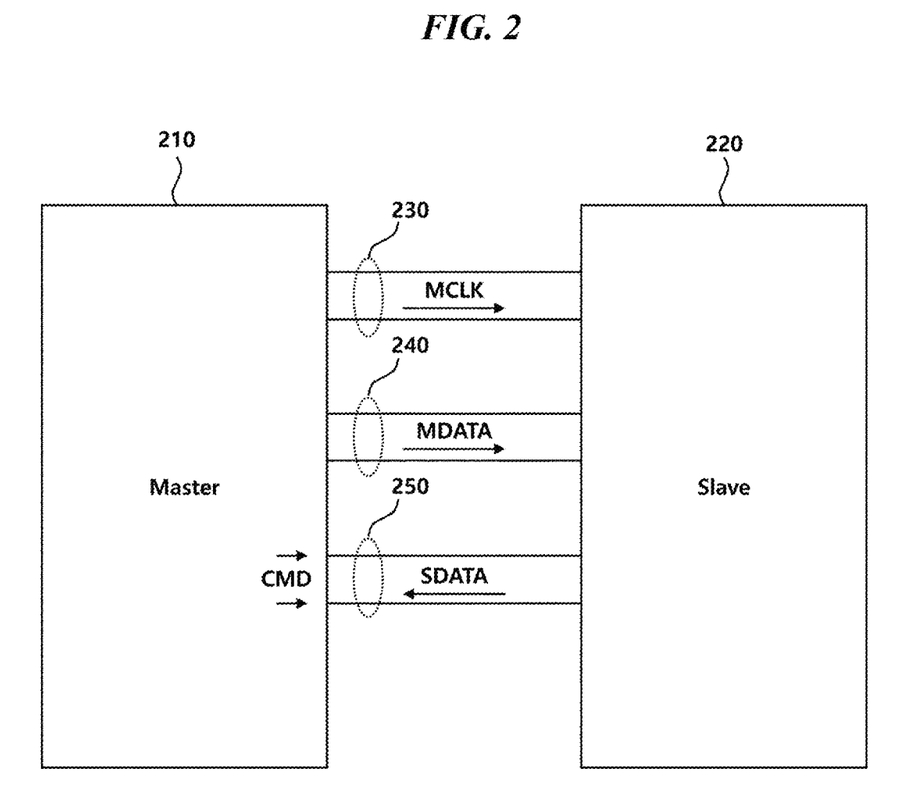
FIG. 2 is a diagram illustrating a method of driving a circuit according to an embodiment.

FIG. 2 is a diagram illustrating a method of driving a circuit according to an embodiment.

When considering an aspect according to the present disclosure, a circuit driving may be performed by a master circuit 210, a slave circuit 220, a first wiring 230 comprising a pair of lines, a second wiring 240 comprising a pair of lines, and a third wiring 250 comprising a pair of lines.

A master/slave technique may mean a technique for an asymmetric communication and control in which a device, a circuit or a processor, corresponding to a master, controls at least one of other devices, circuits or processors corresponding to a slave.

According to a method of driving a circuit according to an embodiment, the master circuit 210 may transmit a master clock signal MCLK to the slave circuit 220 through the first wiring 230, the master circuit 210 may transmit a master data signal MDATA to the slave circuit 220 through the second wiring 240, and the slave circuit 220 may transmit a slave data signal SDATA to the master circuit 210 through the third wiring 250.

Here, the master clock signal MCLK, the master data signal MDATA, and the slave data signal SDATA may be transmitted in a differential signaling method in which a pair of lines is used or in a low voltage differential signaling (LVDS) method.

The master circuit 210 may comprise a phase lock loop (PLL) clock source to control an output signal by using a phase difference between an input signal and a feedback signal of the output signal. The PLL clock source may generate a master clock signal MCLK transmitted by the master circuit 210 to the slave circuit 220.

Since the slave circuit 220 generates a slave data signal SDATA based on a master clock signal MCLK, the slave circuit 220 may receive a master clock signal MCLK in order to generate a slave data signal SDATA.

A master data signal MDATA may be generated based on a master clock signal MCLK and the master circuit 210 may comprise a PPL clock source to generate a master clock signal MCLK. As such, since the master circuit 210 comprises a PPL clock source, the master circuit 210 can control power by itself. However, since the slave circuit 220 needs to receive a master clock signal MCLK in order to generate a slave data signal SDATA, the slave circuit 220 may not be able to control power by itself.

Accordingly, the master circuit 210 may transmit command signals CMD by using the third wiring 250 as two single-ended signal lines in order to control power of the slave circuit 220. In terms of using the third wiring 250, which is used for the slave circuit 220 transmitting a slave data signal SDATA to the master circuit 210, without adding any additional pin or line for transmitting command signals CMD, this method may have an advantage when forming a circuit.

In order to prevent the conflict of data transmission, command signals CMD may be transmitted through the third wiring 250 during a time when the slave data signal SDATA is not transmitted.

Command signals CMD may comprise a command clock signal CCLK and a command data signal CDATA. A command clock signal CCLK may be transmitted through one line of the third wiring 250 and a command data signal CDATA may be transmitted through the other line thereof.

Since a command signal CMD that the master circuit 210 transmits to the slave circuit 220 in order to control power of the slave circuit 220 is a command clock signal CCLK, not a master clock signal MCLK, the master circuit 210 may control power of the slave circuit 220 by transmitting command signals CMD regardless of the transmission of a master clock signal MCLK.

Figure 3:
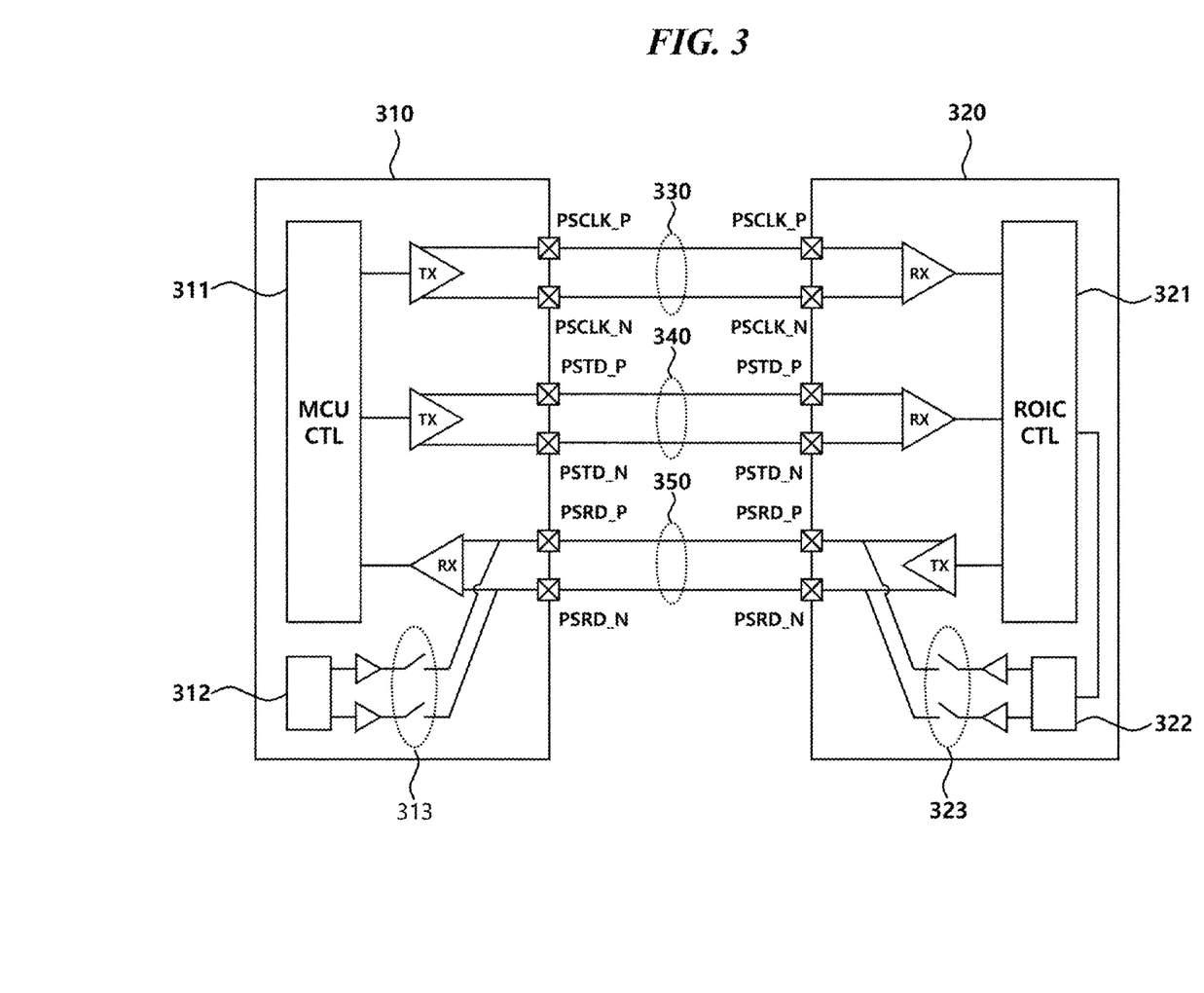
FIG. 3 is a diagram illustrating an interface circuit between a microcontroller and a touch driving device according to an embodiment.

FIG. 3 is a diagram illustrating an interface circuit between a microcontroller and a touch driving device according to an embodiment.

Referring to FIG. 3, when considering an aspect of the present disclosure, the interface circuit may comprise a microcontroller 310, a readout integrated circuit 320, a first wiring 330, a second wiring 340, and a third wiring 350.

The microcontroller 310 may correspond to a master circuit of the master/slave technique and the readout integrated circuit 320 may correspond to a slave circuit thereof. Accordingly, an asymmetric communication may be performed between the readout integrated circuit 320 and the microcontroller 310 and the readout integrated circuit 320 may be controlled by the microcontroller 310.

The microcontroller 310 may comprise a microcontroller unit (MCU) control circuit 311, a command transmission circuit 312, a command transmission switch 313. The microcontroller 310 may also comprise, for the communication with the readout integrated circuit 320, at least one receiver RX, at least one transmitter TX, and at least one pin to which multiple lines are connected. In addition, the microcontroller 310 may comprise an MCU power circuit to control power of the MCU control circuit 311.

The MCU control circuit 311 in the microcontroller 310 may output a master clock signal MCLK and a master data signal MDATA to a control circuit 321 in the readout integrated circuit (ROIC) 320. The at least one transmitter TX in the microcontroller 310 may be used in order that the MCU control circuit 311 outputs the master clock signal MCLK and the master data signal MDATA to the control circuit 321 and at least one receiver RX in the readout integrated circuit 320 may be used in order that the readout integrated circuit 320 receives the master clock signal MCLK and the master data signal MDATA. The microcontroller 310 may receive from the readout integrated circuit 320 a touch data signal TDATA transmitted in the differential signaling method through one pair of lines among multiple pairs of lines and transmit command signals CMD to the readout integrated circuit 320 by using the one pair of lines as two single-ended signal lines.

The readout integrated circuit 320 may comprise a control circuit 321, a command reception circuit 322, and a command reception switch 323. The readout integrated circuit 320 may also comprise, for the communication with the microcontroller 310, at least one transmitter TX, at least one receiver RX, and at least one pin to which multiple lines are connected. The readout integrated circuit 320 may also comprise a power circuit to control power of the control circuit 321.

The control circuit 321 in the readout integrated circuit 320 may output a touch data signal TDATA to the MCU control circuit 311 in the microcontroller 310. The at least one transmitter TX in the readout integrated circuit 320 may be used in order that the control circuit 321 outputs the touch data signal TDATA to the MCU control circuit 311 and the at least one receiver RX in the microcontroller 310 may be used in order that the microcontroller 310 receives the touch data signal TDATA. The readout integrated circuit 320 may transmit to the microcontroller 310 the touch data signal TDATA transmitted in the differential signaling method through one pair of lines among multiple pairs of lines and receive command signals CMD from the microcontroller 310 by using the one pair of lines as two single-ended signal lines.

The first wiring 330 may comprise one pair of lines and, through the first wiring 330, the master clock signal MCLK may be transmitted in the differential signaling method or in the low voltage differential signaling (LVDS) method. The second wiring 340 may comprise one pair of lines and, through the second wiring 340, the master data signal MDATA may be transmitted in the differential signaling method or the LVDS method. The third wiring 350 may comprise one pair of lines and, through the third wiring 350, the touch data signal TDATA may be transmitted in the differential signaling method or in the LVDS method.

The microcontroller 310 may comprise a pair of pins PSCLK_P, PSCLK_N for the connection with the first wiring 330 comprising a pair of lines, a pair of pins PSTD_P, PSTD_N for the connection with the second wiring 340 comprising a pair of lines, and a pair of pins PSRD_P, PSRD_N for the connection with the third wiring 350 comprising a pair of lines.

The readout integrated circuit 320 may comprise a pair of pins PSCLK_P, PSCLK_N for the connection with the first wiring 330 comprising a pair of lines, a pair of pins PSTD_P, PSTD_N for the connection with the second wiring 340 comprising a pair of lines, and a pair of pins PSRD_P, PSRD_N for the connection with the third wiring 350 comprising a pair of lines.

The first wiring 330 may be connected with a first transmitter TX in the microcontroller 310 and with a first receiver RX in the readout integrated circuit 320. The second wiring 340 may be connected with a second transmitter TX in the microcontroller 310 and with a second receiver RX in the readout integrated circuit 320. The third wiring 350 may be connected with a third receiver RX in the microcontroller 310 and with a third transmitter TX in the readout integrated circuit 320. Accordingly, the master clock signal MCLK may be transmitted from the microcontroller 310 to the readout integrated circuit 320 through the first transmitter TX, the first wiring 330, and the first receiver RX. The master data signal MDATA may be transmitted from the microcontroller 310 to the readout integrated circuit 320 through the second transmitter TX, the second wiring 340, and the second receiver RX. The touch data signal TDATA may be transmitted from the readout integrated circuit 320 to the microcontroller 310 through the third transmitter TX, the third wiring 350, and the third receiver RX.

The command transmission circuit 312 in the microcontroller 310 may output command signals CMD to control power of the control circuit 321 and the command signals CMD may be transmitted to the readout integrated circuit 320 through the third wiring 350. The command reception circuit 322 in the readout integrated circuit 320 may receive the command signals CMD through the third wiring 350. The command reception circuit 322 may control power of the control circuit 321 by transmitting the command signals CMD to the control circuit 321.

The MCU control circuit 311 may comprise a phase lock loop (PLL) clock source to control an output signal by using a phase difference between an input signal and a feedback signal of the output signal and the PLL clock source may generate a master clock signal MCLK that the microcontroller 310 transmits to the readout integrated circuit 320.

Since the readout integrated circuit 320 generates a touch data signal TDATA based on a master clock signal MCLK outputted from the microcontroller 310, the readout integrated circuit 320 needs to receive a master clock signal MCLK in order to generate a touch data signal TDATA.

A master data signal MDATA may be generated based on a master clock signal MCLK and the microcontroller 310 may comprise a PPL clock source to generate a master clock signal MCLK. As such, since the microcontroller 310 comprises a PPL clock source, the microcontroller 310 can control power by itself. However, since the readout integrated circuit 320 needs to receive a master clock signal MCLK in order to generate a touch data signal TDATA, the readout integrated circuit 320 may not be able to control power by itself.

Accordingly, the microcontroller 310 may transmit command signals CMD including information for controlling power of the readout integrated circuit 320 by using the third wiring 350 as two single-ended signal lines in order to control power of the readout integrated circuit 320. In terms of using the third wiring 350, which is used for the readout integrated circuit 320 transmitting a touch data signal TDATA to the microcontroller 310, without adding any additional pin or line for transmitting command signals CMD, this method may have an advantage when forming a circuit.

Command signals CMD may comprise a command clock signal CCLK and a command data signal CDATA. A command clock signal CCLK may be transmitted through one line of the third wiring 350 and a command data signal CDATA may be transmitted through the other line thereof. That is, a touch data signal TDATA, and a command clock signal CCLK and a command data signal CDATA may be transmitted through the third wiring 350 at different times. A command signal CMD may comprise a parity bit and a reset clock to initialize a shift register in the readout integrated circuit 320. A command data signal CDATA may start with '010', comprise 7 bits of data, and use a parity bit in order to prevent the mis-operation during communication due to noise. A reset clock, which is an eighth clock, may be to reset a shift flipflop in the readout integrated circuit (320)

In order that a touch data signal TDATA and command signals CMD may be transmitted through the third wiring 350 at different times, command transmission switches 313 may be disposed between the command transmission circuit 312 and the third wiring 350 in the microcontroller 310 and command reception switches 323 may be disposed between the command reception circuit 322 and the third wiring 350 in the readout integrated circuit 320. Since the third wiring 350 may comprise a pair of lines, the command transmission circuit 312 may be connected with the third wiring 350 by a pair of lines in a way that the lines of the third wiring are connected respectively with the pair of lines and the command reception circuit 322 may be connected with the third wiring 350 by a pair of line in the same way.

The command transmission circuit 312 may be connected with the MCU control circuit 311 or the third receiver RX in the microcontroller 310 in parallel and the command reception circuit 322 may be connected with the control circuit 321 or the third transmitter TX in the readout integrated circuit 320 in parallel. In addition, for the communication of the command signals CMD between the microcontroller 310 and the readout integrated circuit 320, the microcontroller 310 may comprise transmitters TX between the third wiring 350 and the command transmission circuit 312 and the readout integrated circuit 320 may comprise receivers RX between the third wiring 350 and the command reception circuit 322.

In order to prevent the conflict of data transmission, command signals CMD may be transmitted through the third wiring 350 during a time when a touch data signal TDATA is not transmitted.

In order that the command signals CMD are transmitted through the third wiring 350 at a different time with a touch data signal TDATA, the command transmission switches 313 and the command reception switches 323 may be controlled. That is, when command signals CMD are transmitted through the third wiring 350, the command transmission switches 313 and the command reception switches 323 may be turned on and when a touch data signal TDATA is transmitted through the third wiring 350, the command transmission switches 313 and the command reception switches 323 may be turned off.

Since a command signal CMD that the microcontroller 310 transmits to the readout integrated circuit 320 in order to control power of the readout integrated circuit 320 is a command clock signal CCLK, not a master clock signal MCLK, the microcontroller 310 may control power of the readout integrated circuit 320 by transmitting command signals CMD regardless of the transmission of a master clock signal MCLK.

Figure 4:
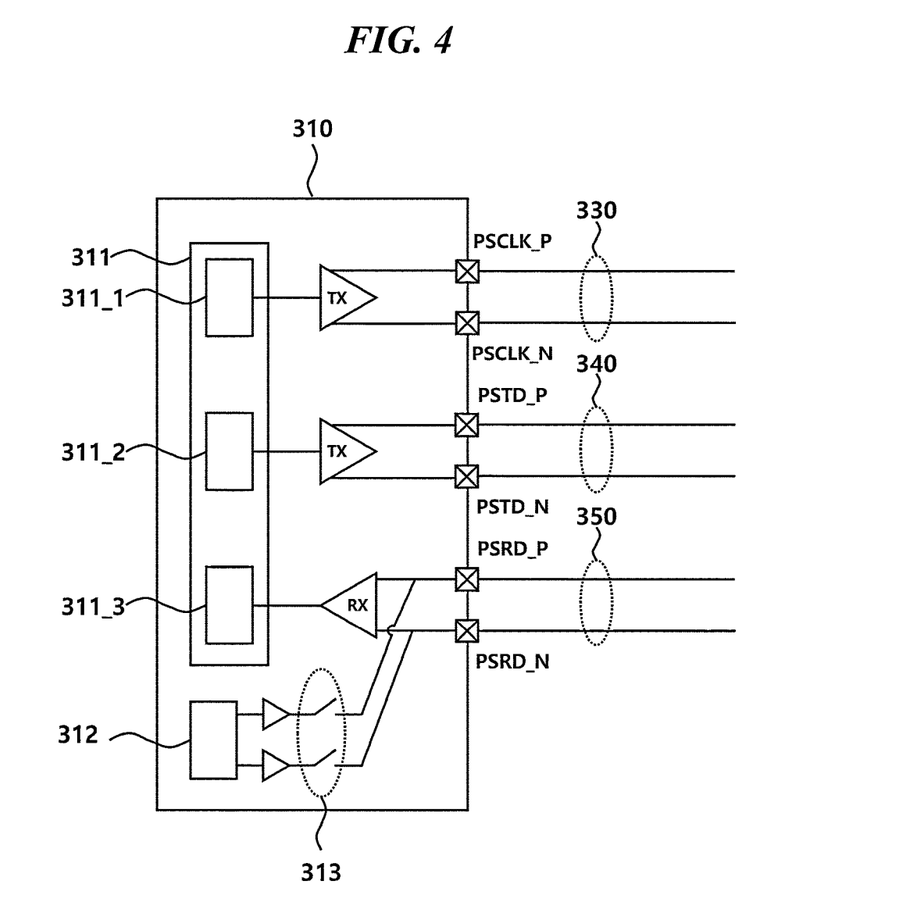
FIG. 4 is a diagram illustrating a power control of a microcontroller unit (MCU) control circuit in a microcontroller according to an embodiment.

FIG. 4 is a diagram illustrating a power control of an MCU control circuit in a microcontroller according to an embodiment.

Referring to FIG. 4, when considering an aspect according to the present disclosure, the microcontroller 310 may comprise an MCU control circuit 311, a command transmission circuit 312, and command transmission switches 313. In addition, the microcontroller 310 may comprise a first transmitter TX, a second transmitter TX, a third receiver RX, and an MCU power circuit to control power of the MCU control circuit 311.

The MCU control circuit 311 may be connected with the first transmitter TX, the second transmitter TX, and the third receiver RX. The first transmitter TX may be connected with the first wiring 330 by a pair of pins PSCLK_P, PSCLK_N, the second transmitter TX may be connected with the second wiring 340 by a pair of pins PSTD_P, PSTD_N, and the third receiver RX may be connected with the third wiring 350 by a pair of pins PSRD_P, PSRD_N.

The MCU control circuit 311 may comprise a first MCU sub-circuit 311_1, a second MCU sub-circuit 311_2, and a third MCU sub-circuit 311_3. The first MCU sub-circuit 311_1 may be connected with the first transmitter TX, the second MCU sub-circuit 311_2 may be connected with the second transmitter TX, and the third MCU sub-circuit 311_3 may be connected with the third receiver RX. Accordingly, the first MCU sub-circuit 311_1 may use the first wiring 330, the second MCU sub-circuit 311_2 may use the second wiring 340, and the third MCU sub-circuit 311_3 may use the third wiring 350.

The MCU power circuit may turn off some circuits of the microcontroller 310, which use the first wiring 330, the second wiring 340, and the third wiring 350. That is, the MCU power circuit may separately control power of the first MCU sub-circuit 311_1, the second MCU sub-circuit 311_2, and the third MCU sub-circuit 311_3. When the first MCU sub-circuit 311_1 is turned on, a master clock signal MCLK may be transmitted and, when the first MCU sub-circuit 311_1 is turned off, a master clock signal MCLK may not be transmitted. When the second MCU sub-circuit 311_2 is turned on, a master data signal MDATA may be transmitted and, when the second MCU sub-circuit 311_2 is turned off, a master data signal MDATA may not be transmitted. When the third MCU sub-circuit 311_3 is turned on, a touch data signal TDATA may be received and, when the third MCU sub-circuit 311_3 is turned off, a touch data signal TDATA may not be received.

Figure 5:
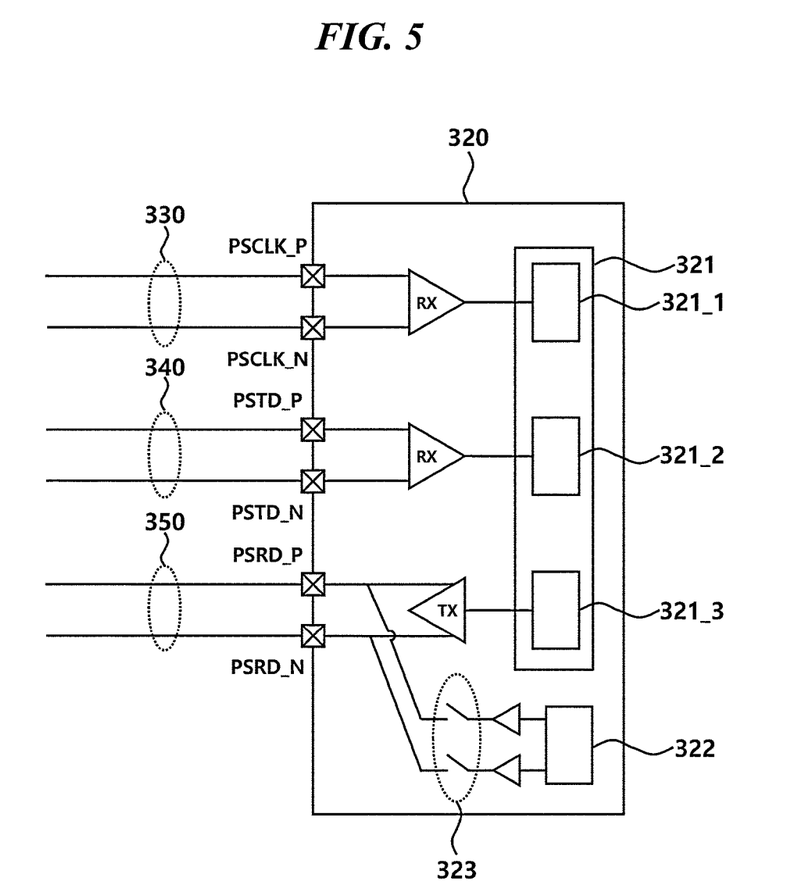
FIG. 5 is a diagram illustrating a power control of a control circuit in a readout integrated circuit (ROIC) according to an embodiment.

FIG. 5 is a diagram illustrating a power control of a control circuit in a readout integrated circuit according to an embodiment.

Referring to FIG. 5, when considering an aspect according to the present disclosure, the readout integrated circuit 320 may comprise a control circuit 321, a command reception circuit 322, and command reception switches 323. In addition, the readout integrated circuit 320 may comprise a first receiver RX, a second receiver RX, a third transmitter TX, and a power circuit to control power of the control circuit 321.

The control circuit 321 may be connected with the first receiver RX, the second receiver RX, and the third transmitter TX. The first receiver RX may be connected with the first wiring 330 by a pair of pins PSCLK_P, PSCLK_N, the second receiver RX may be connected with the second wiring 340 by a pair of pins PSTD_P, PSTD_N, and the third transmitter TX may be connected with the third wiring 350 by a pair of pins PSRD_P, PSRD_N.

The control circuit 321 of the ROIC may comprise a first ROIC sub-circuit 321_1, a second ROIC sub-circuit 321_2, and a third ROIC sub-circuit 321_3. The first ROIC sub-circuit 321_1 may be connected with the first receiver RX, the second ROIC sub-circuit 321_2 may be connected with the second receiver RX, and the third ROIC sub-circuit 321_3 may be connected with the third transmitter TX. Accordingly, the first ROIC sub-circuit 321_1 may use the first wiring 330, the second ROIC sub-circuit 321_2 may use the second wiring 340, and the third ROIC sub-circuit 321_3 may use the third wiring 350.

The power circuit of the ROIC may turn off some circuits of the readout integrated circuit 320, which use the first wiring 330, the second wiring 340, and the third wiring 350. That is, the power circuit of the ROIC may separately control power of the first ROIC sub-circuit 321_1, the second ROIC sub-circuit 321_2, and the third ROIC sub-circuit 321_3. When the first ROIC sub-circuit 321_1 is turned on, a master clock signal MCLK may be received and, when the first ROIC sub-circuit 321_1 is turned off, a master clock signal MCLK may not be received. When the second ROIC sub-circuit 321_2 is turned on, a master data signal MDATA may be received and, when the second ROIC sub-circuit 321_2 is turned off, a master data signal MDATA may not be received. When the third ROIC sub-circuit 321_3 is turned on, a touch data signal TDATA may be transmitted and, when the third ROIC sub-circuit 321_3 is turned off, a touch data signal TDATA may not be transmitted.

Figure 6:
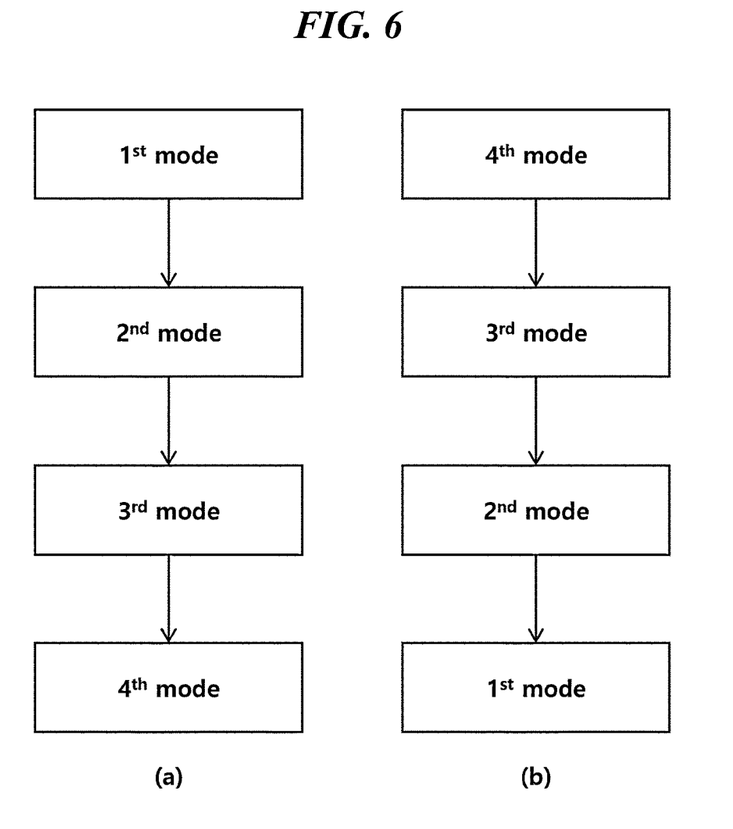
FIG. 6 is a diagram illustrating an operation mode of an interface circuit according to an embodiment.

FIG. 6 is a diagram illustrating an operation mode of an interface circuit according to an embodiment.

When considering an aspect according to the present disclosure, the interface circuit may operate in four modes. Accordingly, the microcontroller 310 and the readout integrated circuit 320 may operate in four modes.

In a first mode, some circuits of the MCU control circuit 311, which transmit a master clock signal MCLK and a master data signal MDATA by using the first wiring 330 and the second wiring 340, are turned off and some circuits of the control circuit 321 of the ROIC, which receive the master clock signal MCLK and the master data signal MDATA by using the first wiring 330 and the second wiring 340, are turned off. The command transmission circuit 312 in the microcontroller 310 may output command signals CMD to the command reception circuit 322 in the readout integrated circuit 320 by using the third wiring 350 comprising a pair of lines as two single-ended signal transmission lines. Here, the command transmission switches 313 and the command reception switches 323 may be turned on. In addition, some circuits of the control circuit 321 of the ROIC, which transmit a touch data signal TDATA by using the third wiring 350, are turned off and some circuits of the MCU control circuit 311, which receive the touch data signal TDATA by using the third wiring 350, are turned off. Here, some circuits of the MCU control circuit 311 and the control circuit 321 of the ROIC using the first wiring may be the first MCU sub-circuit 311_1 and the first ROIC sub-circuit 321_1, some circuits of the MCU control circuit 311 and the ROIC control circuit 321 using the second wiring may be the second MCU sub-circuit 311_2 and the second ROIC sub-circuit 321_2, and some circuits of the MCU control circuit 311 and the ROIC control circuit 321 using the third wiring may be the third MCU sub-circuit 311_3 and the third ROIC sub-circuit 321_3.

In a second mode, some circuits of the MCU control circuit 311, which transmit master clock signals MCLK by using the first wiring 330, are turned on and some circuits of the control circuit 321 of the ROIC, which receive the master clock signals MCLK by using the first wiring 330, are turned on. Some circuits of the MCU control circuit 311, which transmit master data signals MDATA by using the second wiring 340, are turned off and some circuits of the control circuit 321 of the ROIC, which receive the master data signals MDATA by using the second wiring 340, are turned off. The command transmission circuit 312 in the microcontroller 310 may output command signals CMD to the command reception circuit 322 in the readout integrated circuit 320 by using the third wiring 350 comprising a pair of lines as two single-ended signal transmission lines. Here, the command transmission switches 313 and the command reception switches 323 may be turned on. In addition, some circuits of the control circuit 321 of the ROIC, which transmit touch data signals TDATA by using the third wiring 350, are turned off and some circuits of the MCU control circuit 311, which receive the touch data signals TDATA by using the third wiring 350, are turned off. Here, some circuits of the MCU control circuit 311 and the control circuit 321 of the ROIC using the first wiring may be the first MCU sub-circuit 311_1 and the first ROIC sub-circuit 321_1, some circuits of the MCU control circuit 311 and the control circuit 321 of the ROIC using the second wiring may be the second MCU sub-circuit 311_2 and the second ROIC sub-circuit 321_2, and some circuits of the MCU control circuit 311 and the control circuit 321 of the ROIC using the third wiring may be the third MCU sub-circuit 311_3 and the third ROIC sub-circuit 321_3.

In a third mode, some circuits of the MCU control circuit 311, which transmit a master clock signal MCLK and a master data signal MDATA by using the first wiring 330 and the second wiring 340, are turned on and some circuits of the control circuit 321 of the ROIC, which receive the master clock signal and the master data signal MDATA by using the first wiring 330 and the second wiring 340, are turned on. The command transmission circuit 312 in the microcontroller 310 may output command signals CMD to the command reception circuit 322 in the readout integrated circuit 320 by using the third wiring 350 comprising a pair of lines as two single-ended signal transmission lines. Here, the command transmission switches 313 and the command reception switches 323 may be turned on. In addition, some circuits of the control circuit 321 of the ROIC, which transmit a touch data signal TDATA by using the third wiring 350, are turned off and some circuits of the MCU control circuit 311, which receive the touch data signal TDATA by using the third wiring 350, are turned off. Here, some circuits of the MCU control circuit 311 and the control circuit 321 of the ROIC using the first wiring may be the first MCU sub-circuit 311_1 and the first ROIC sub-circuit 321_1, some circuits of the MCU control circuit 311 and the control circuit 321 of the ROIC using the second wiring may be the second MCU sub-circuit 311_2 and the second ROIC sub-circuit 321_2, and some circuits of the MCU control circuit 311 and the control circuit 321 of the ROIC using the third wiring may be the third MCU sub-circuit 311_3 and the third ROIC sub-circuit 321_3.

In a fourth mode, some circuits of the MCU control circuit 311, which transmit a master clock signal MCLK and a master data signal MDATA by using the first wiring 330 and the second wiring 340, are turned on and some circuits of the control circuit 321 of the ROIC, which receive the master clock signal and the master data signal MDATA by using the first wiring 330 and the second wiring 340, are turned on. The command transmission switches 313 and the command reception switches 323 may be turned off. The command transmission circuit 312 in the microcontroller 310 may not output command signals CMD to the command reception circuit 322 in the readout integrated circuit 320. Some circuits of the control circuit 321 of the ROIC, which transmit a touch data signal TDATA by using the third wiring 350, are turned on and some circuits of the MCU control circuit 311, which receive the touch data signal TDATA by using the third wiring 350, are turned on. Here, some circuits of the MCU control circuit 311 and the control circuit 321 of the ROIC using the first wiring may be the first MCU sub-circuit 311_1 and the first ROIC sub-circuit 321_1, some circuits of the MCU control circuit 311 and the control circuit 321 of the ROIC using the second wiring may be the second MCU sub-circuit 311_2 and the second ROIC sub-circuit 321_2, and some circuits of the MCU control circuit 311 and the control circuit 321 of the ROIC using the third wiring may be the third MCU sub-circuit 311_3 and the third ROIC sub-circuit 321_3.

When operating, the interface circuit according to an embodiment may enter sequentially the first mode, the second mode, the third mode, and the fourth mode or sequentially the fourth mode, the third mode, the second mode, and the first mode. Accordingly, the microcontroller 310 and the readout integrated circuit 320 may also enter sequentially the first mode, the second mode, the third mode, and the fourth mode or sequentially the fourth mode, the third mode, the second mode, and the first mode when operating. In addition, the interface circuit according to an embodiment, which is operating in the first mode, may enter the third mode, in which a master clock signal MCLK and a master data signal MDATA are transmitted, without passing through the second mode. On the contrary, the interface circuit according to an embodiment, which is operating in the third mode, may enter the first mode without passing through the second mode. Accordingly, the microcontroller 310 and the readout integrated circuit 320, which are operating in the first mode, may also enter the third mode without passing through the second mode and the microcontroller 310 and the readout integrated circuit 320, which are operating in the third mode, may enter the first mode without passing through the second mode.

The first mode may be referred to as a low power mode (LPMODE), the second mode may be referred to as a clock mode (CKMODE), the third mode may be referred to as an interface mode for writing (IFMODE_WRITE), and the fourth mode may be referred to as an interface mode for reading (IFMODE_READ).

Figure 7:
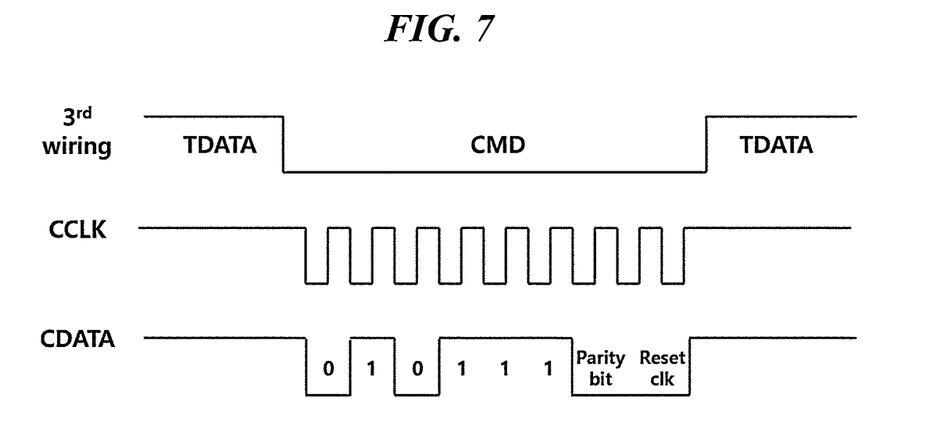
FIG. 7 is a diagram illustrating command signals according to an embodiment.

FIG. 7 is a diagram illustrating command signals according to an embodiment.

Referring to FIG. 7, through a wiring comprising one pair of lines in the interface circuit, a touch data signal TDATA may be transmitted in the differential signaling method or the LVDS method. Otherwise, command signals CMD may be transmitted by using the one pair of lines, through which the touch data signal TDATA is transmitted, as two single-ended signal transmission lines during a time when the touch data signal TDATA is not transmitted.

Each of the command signals CMD may comprise information for controlling power of the readout integrated circuit 320. The command signals CMD may comprise a command clock signal CCLK and a command data signal CDATA. A command clock signal CCLK may be transmitted through one of a pair of lines, through which the command signals CMD are transmitted, and a command data signal CDATA may be transmitted through the other line.

A command clock signal CCLK may make 8 pulse signals as a period and a command data signal CDATA may be generated based on a command clock signal. A command data signal CDATA may comprise 7 bits of data comprising 0s and 1s. A seventh bit of data may be a parity bit in order to prevent a mis-operation due to noise during a communication and an eighth bit of data corresponding to an eighth clock pulse may include a reset clock to initialize a shift register comprised in the readout integrated circuit 320.

Figure 8:
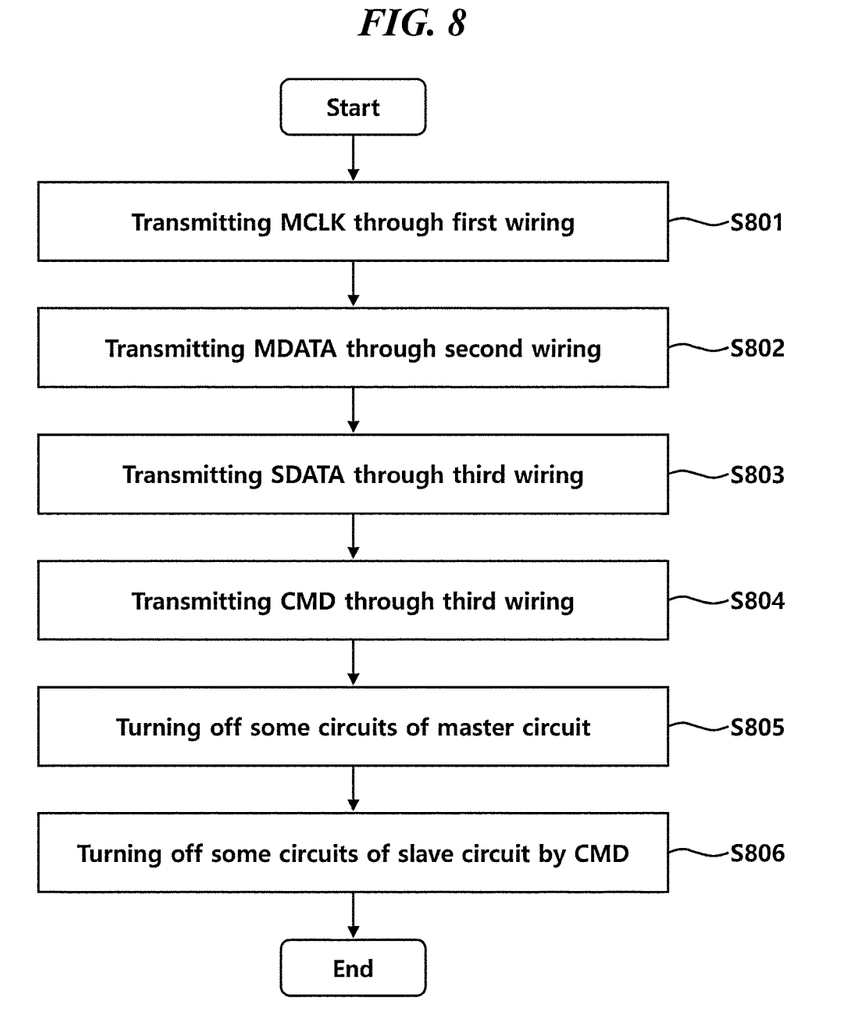
FIG. 8 is a flow diagram illustrating a method of driving an interface circuit according to an embodiment.

FIG. 8 is a flow diagram illustrating a method of driving an interface circuit according to an embodiment.

Referring to FIG. 8, a method of driving an interface circuit according to an embodiment may comprise transmitting a master clock signal from a master circuit to a slave circuit through a first wiring in a differential signaling method (S801). The first wiring may comprise a pair of lines.

The method may also comprise transmitting a master data signal from the master circuit to the slave circuit through a second wiring in the differential signaling method (S802). The second wiring may comprise a pair of lines.

The method may also comprise transmitting a slave data signal from the slave circuit to the master circuit through a third wiring in the differential signaling method (S803). A slave data signal may be generated based on a master clock signal transmitted from the master circuit. Therefore, a slave data signal cannot be generated when a master clock signal is not transmitted.

The method may also comprise transmitting command signals, to control power of the slave circuit, from the master circuit to the slave circuit by using the third wiring as a pair of single-ended signal transmission lines (S804). When a slave data signal is transmitted through the third wiring, command signals may not be transmitted and, when command signals are transmitted through the third wiring, a slave data signal may not be transmitted. The transmission of command signals may be controlled by command transmission switches provided in the master circuit and command reception switches provided in the slave circuit. Command signals may comprise a command data signal and a command clock signal. A command data signal may be transmitted through one of a pair of lines comprised in the third wiring and a command clock signal may be transmitted through the other line thereof.

The method may also comprise turning off some circuits of the master circuit, which use the first wiring, the second wiring, and the third wiring (S805). The master circuit comprises a clock source to generate a master clock signal. Therefore, a circuit generating master data signals is not necessarily always turned on. In addition, some or all power of the master circuit may be controlled by a power circuit comprised in the master circuit.

The method may also comprise turning off some circuits of the slave circuit, which use the first wiring, the second wiring, and the third wiring (S806). The slave circuit may comprise a power circuit to control some or all power of the slave circuit. Command signals transmitted from the master circuit may be transmitted to the power circuit in the slave circuit and the power of the slave circuit may be controlled according to information included in the command signals.

Figure 9:
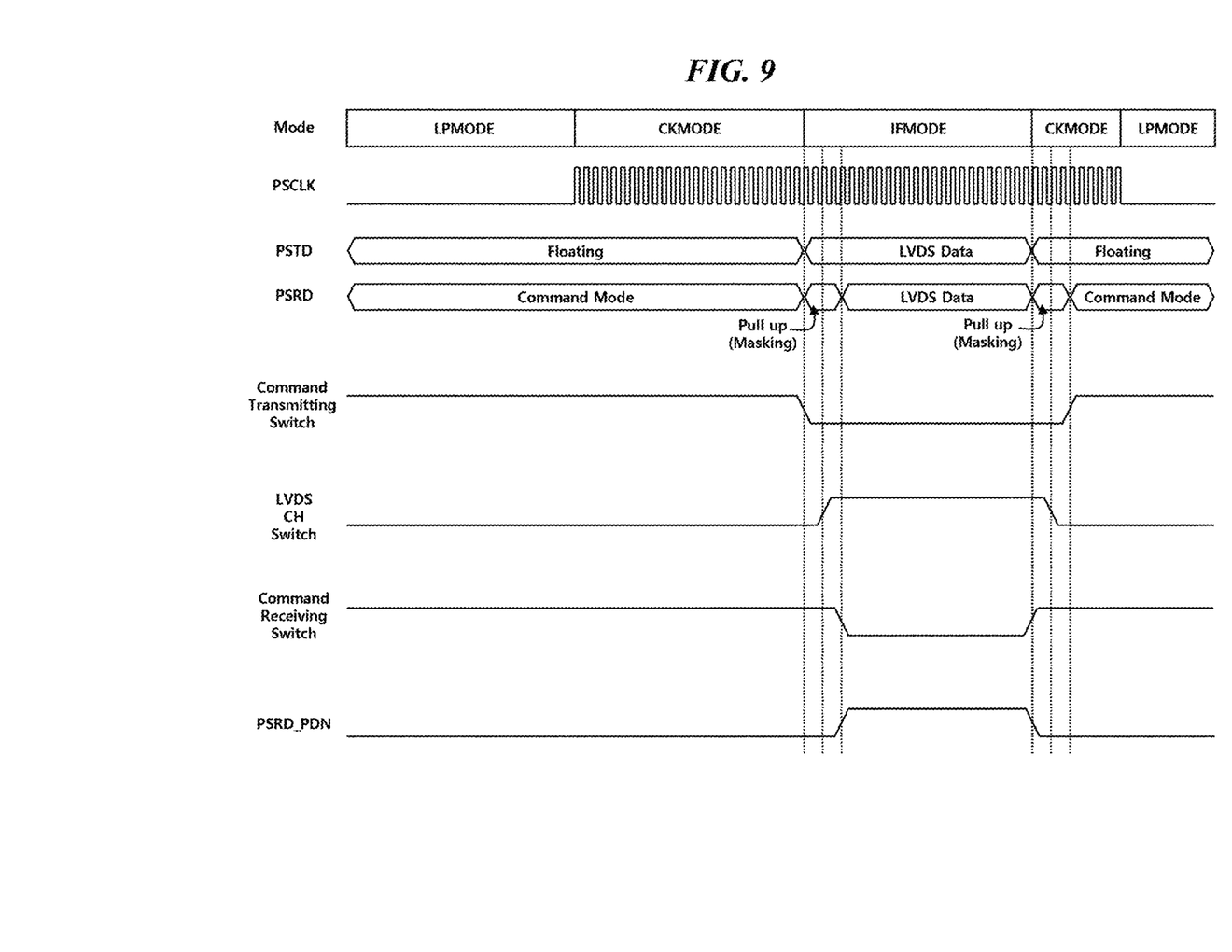
FIG. 9 is a diagram illustrating timings of an interface circuit according to an embodiment.

FIG. 9 is a diagram illustrating timings of an interface circuit according to an embodiment.

Referring to FIG. 9, the interface circuit according to present disclosure may operate in a low power mode LPMODE, a clock mode CKMODE, or an interface mode IFMODE. Here, the interface mode may comprise an interface mode for writing and an interface mode for reading. In the clock mode and the interface mode, master clock signals may be transmitted or received through pins PSCLK of the microcontroller and pins PSCLK of the readout integrated circuit. In the interface mode, data, which is transmitted in an LVDS method, may be transmitted or received through pins PSTD of the microcontroller and pins PSTD of the readout integrated circuit. The data may mean master data signals. Through pins PSRD of the microcontroller and pins PSRD of the readout integrated circuit, data transmitted in an LVDS method in the interface mode, may be transmitted or received. The data may mean slave data signals. In the low power mode and the clock mode, command signals may be transmitted by using a pair of lines as two single-ended signal transmission lines. A mode, in which command signals are transmitted in the pins PSRD of the microcontroller and the readout integrated circuit, may be referred to as a command mode. The LVDS CH SWITCH may mean a switch, which may be disposed in the microcontroller, for receiving data transmitted in an LVDS method through the pins PSRD. The PSRD_PDN may mean a switch, which may be disposed in the readout integrated circuit, for transmitting data transmitted in an LVDS method through the pins PSRD.

What is claimed is:

1. A microcontroller comprising:
a command transmission circuit to generate command signals,
the microcontroller
to receive in a differential signaling method a touch data signal generated in a readout integrated circuit (ROIC) through a pair of lines connected with the readout integrated circuit, and
to transmit the command signals to the readout integrated circuit by using the pair of lines as two single-ended signal transmission lines.

2. The microcontroller of claim 1, further comprising:
a pair of command transmission switches between the command transmission circuit and the pair of lines,
wherein the pair of command transmission switches are turned on when the command signals are transmitted through the pair of lines and turned off when the touch data signal is transmitted therethrough.

3. The microcontroller of claim 1, wherein the command signals comprise a command clock signal and a command data signal and the command transmission circuit transmits the command clock signal through one of the pair of lines and transmits the command data signal through the other line thereof.

4. The microcontroller of claim 3, wherein the command clock signal is different from the master clock signal and the command data signal comprises information for controlling power of the readout integrated circuit.

5. The microcontroller of claim 1, wherein the command signals control a power circuit in the readout integrated circuit to control power of the readout integrated circuit.

6. The microcontroller of claim 1, wherein a command signal comprises a parity bit and a reset clock to initialize a shift register in the readout integrated circuit.

7. The microcontroller of claim 1, comprising:
a microcontroller unit (MCU) control circuit to output a master clock signal and a master data signal, wherein the MCU control circuit comprises a first wiring comprising a pair of lines to transmit the master clock signal in a differential signaling method, a second wiring comprising a pair of lines to transmit the master data signal in the differential signaling method, and a third wiring comprising a pair of lines to receive the touch data signal in the differential signaling method; and
a pair of command transmission switches between the command transmission circuit and the third wiring.

8. The microcontroller of claim 7, further comprising:
an MCU power circuit to control power,
wherein the MCU power circuit controls power of some circuits of the microcontroller, which use the first wiring, the second wiring, or the third wiring.

9. A readout integrated circuit comprising:
a command reception circuit to receive command signals generated in a microcontroller,
the readout integrated circuit
to generate a touch data signal,
to transmit the touch data signal to the microcontroller through a pair of lines connected with the microcontroller in a differential signaling method, and
to receive the command signals by using the pair of lines as two single-ended signal transmission lines.

10. The readout integrated circuit of claim 9, wherein the touch data signal is generated based on a master clock signal received from the microcontroller.

11. The readout integrated circuit of claim 9, further comprising:
a pair of command reception switches between the command reception circuit and the pair of lines,
wherein the pair of command reception switches are turned on when the command signals are transmitted through the pair of lines and turned off when the touch data signal is transmitted therethrough.

12. The readout integrated circuit of claim 9, comprising:
a control circuit to output the touch data signal, wherein the control circuit comprises a first wiring comprising a pair of lines to receive a master clock signal generated in an MCU control circuit in a differential signaling method, a second wiring comprising a pair of lines to receive a master data signal generated in the MCU control circuit in the differential signaling method, and a third wiring comprising a pair of lines to transmit the touch data signal in the differential signaling method; and
a pair of command reception switches between the command reception circuit and the third wiring.

13. The readout integrated circuit of claim 12, further comprising
a power circuit to control power,
wherein the power circuit controls power of some circuits of the control circuit, which use the first wiring or the second wiring, according to control of the command signals.

14. The readout integrated circuit of claim 12, wherein the readout integrated circuit operates in four modes,
wherein a first mode is a mode in which the control circuit is turned off by receiving the command signals from the microcontroller, the command signals being received through the third wiring,
a second mode is a mode in which a circuit of the control circuit, which uses the first wiring, is turned on by receiving the master clock signal from the microcontroller, the command signals being received through the third wiring,
a third mode is a mode in which circuits of the control circuit, which use the first wiring and the second wiring, are turned on by receiving the master clock signal and the master data signal from the microcontroller, the command signals being received through the third wiring, and
a fourth mode is a mode in which circuits of the control circuit, which use the first wiring and the second wiring, are turned on to receive the master clock signal and the master data signal from the microcontroller and the control circuit outputs the touch data signal through the third wiring.

15. The readout integrated circuit of claim 14, wherein the readout integrated circuit sequentially enters the first mode, the second mode, the third mode, and the fourth mode or sequentially enters the fourth mode, the third mode, the second mod, and the first mode.

16. A method of driving a circuit comprising:
transmitting a master clock signal and a master data signal from a master circuit to a slave circuit through a first wiring and a second wiring in a differential signaling method;
transmitting a slave data signal from the slave circuit to the master circuit through a third wiring in the differential signaling method; and
transmitting command signals from the master circuit to the slave circuit in order to control power of the slave circuit by using the third wiring as a pair of single-ended signal transmission lines.

17. The method of driving a circuit of claim 16, wherein the slave data signal is generated based on the master clock signal.

18. The method of driving a circuit of claim 16, wherein the command signals comprise a command data signal and a command clock signal, wherein the command data signal is transmitted through one of the lines of the third wiring and the command clock signal is transmitted through the other line thereof.

19. The method of driving a circuit of claim 16, wherein the command signals are not transmitted through the third wiring when the slave data signal is transmitted therethrough and the slave data signal is not transmitted through the third wiring when the command signals are transmitted therethrough.

20. The method of driving a circuit of claim 16, further comprising:
turning off some circuits of the master circuit, which use the first wiring or the second wiring through which the master clock signal or the master data signal is transmitted, and turning off some circuits of the slave circuit, which use the first wiring or the second wiring by using the command signals.

* * * * *